United States Patent
Conway et al.

(10) Patent No.: US 12,466,725 B1
(45) Date of Patent: Nov. 11, 2025

(54) APPARATUS AND METHOD FOR POSITION SENSING IN MEMS ACTUATORS USING TEMPERATURE RESISTANCE VARIATIONS

(71) Applicant: Connaught Electronics Ltd., Tuam County (IE)

(72) Inventors: Gerard Conway, Troy, MI (US); Margaret Glavin, County Galway (IE); Terrance Gus McDonald, Tuam County (IE); Enda Leo Stockwell, Tuam County (IE)

(73) Assignee: Connaught Electronics Ltd. (IE)

( * ) Notice: Subject to any disclaimer, the term of this patent is extended or adjusted under 35 U.S.C. 154(b) by 0 days.

(21) Appl. No.: 19/215,586

(22) Filed: May 22, 2025

(51) Int. Cl.
| | |
|---|---|
| *B81B 7/02* | (2006.01) |
| *G03B 13/36* | (2021.01) |
| *H04N 23/54* | (2023.01) |
| *H04N 23/67* | (2023.01) |
| *H04N 23/68* | (2023.01) |

(52) U.S. Cl.
CPC ............... *B81B 7/02* (2013.01); *G03B 13/36* (2013.01); *H04N 23/54* (2023.01); *H04N 23/67* (2023.01); *H04N 23/687* (2023.01); *B81B 2201/0278* (2013.01); *B81B 2201/038* (2013.01); *B81B 2203/0163* (2013.01); *B81B 2207/012* (2013.01); *B81B 2207/07* (2013.01)

(58) Field of Classification Search
CPC ............. B81B 7/02; B81B 2201/0278; B81B 2201/038; B81B 2203/0163; B81B 2207/012; B81B 2207/07; G03B 13/36; H04N 23/54; H04N 23/67; H04N 23/687
See application file for complete search history.

(56) References Cited

U.S. PATENT DOCUMENTS

| | | | |
|---|---|---|---|
| 8,035,693 B2 * | 10/2011 | Chiou .................... | H04N 23/68 348/208.99 |
| 8,358,296 B2 * | 1/2013 | Anderson ............ | G09G 3/3466 345/211 |
| 8,402,561 B2 | 3/2013 | Sarkar | |
| 11,708,263 B2 | 7/2023 | Ba-Tis et al. | |
| 2013/0264610 A1 * | 10/2013 | Chen ..................... | H01L 23/345 257/467 |
| 2022/0048760 A1 * | 2/2022 | deKoninck .......... | G01L 9/0072 |
| 2022/0357356 A1 * | 11/2022 | Jemili ................... | G01P 15/125 |
| 2022/0373396 A1 * | 11/2022 | Cho ....................... | G01J 5/532 |
| 2023/0358781 A1 * | 11/2023 | Pan ....................... | B64C 39/024 |
| 2025/0085170 A1 * | 3/2025 | Lilleland ................ | G01K 7/02 |

FOREIGN PATENT DOCUMENTS

CN            119344645 A  *  1/2025  ............. A61B 18/24

* cited by examiner

*Primary Examiner* — Padma Haliyur
(74) *Attorney, Agent, or Firm* — Dickinson Wright PLLC (57) ABSTRACT

In the field of micro-electromechanical systems (MEMS) for autofocus camera systems, a MEMS device comprises a fixed part, a movable platform with an image sensor, and temperature sensors on both the platform and fixed part. A processor calculates the temperature difference to determine the platform's displacement. This method eliminates the need for additional capacitive or piezoelectric components, reducing complexity and cost. The described technology is particularly useful in consumer electronics, such as smartphone and automotive cameras, where precise focus control may be vital.

20 Claims, 8 Drawing Sheets

APPARATUS AND METHOD FOR POSITION SENSING IN MEMS ACTUATORS USING TEMPERATURE RESISTANCE VARIATIONS

TECHNICAL FIELD

The present disclosure pertains to micro-electromechanical systems (MEMS) technology, specifically focusing on position sensing methods for MEMS actuators by utilizing temperature resistance variations during actuation.

BACKGROUND

In the field of micro-electromechanical systems (MEMS) used in autofocus camera systems, there is a persistent challenge in accurately determining the position during operation. Traditional methods often rely on complex and costly feedback mechanisms, such as capacitive or piezoelectric sensors, to ascertain position. These methods can add significant complexity and expense to the system, making them less desirable for widespread application in consumer electronics.

Despite advancements in technology, many systems still lack an efficient and cost-effective means of position sensing. This absence of a reliable position sensing mechanism can lead to issues such as misalignment and focus errors, particularly during the initial power-up phase or when the system is subjected to varying environmental conditions.

SUMMARY

In one embodiment, the disclosure includes a MEMS device comprising a fixed part; a platform suspended above the fixed part, wherein the platform is configured to be moveable relative to the fixed part; an image sensor disposed on the platform such that the image sensor moves with the platform; a first temperature sensor disposed on either the platform or the image sensor such that the first temperature sensor moves with the platform, wherein the first temperature sensor is configured to measure a first temperature of either the platform or the image sensor; a second temperature sensor disposed on the fixed part, wherein the second temperature sensor is configured to measure a second temperature of the fixed part; and a processor communicatively connected to the first temperature sensor and the second temperature sensor, wherein the processor is programmed to determine a temperature difference between the first temperature and the second temperature, and determine a relative displacement of the platform relative to the fixed part based upon the temperature difference.

In another embodiment, the disclosure includes a MEMS device comprising a fixed part; a platform configured to be moveable relative to the fixed part; an image sensor disposed on the platform such that the image sensor moves with the platform; a first temperature sensor disposed on the platform such that the first temperature sensor moves with the platform, wherein the first temperature sensor is configured to measure a first temperature of the platform; a second temperature sensor disposed on the fixed part, wherein the second temperature sensor is configured to measure a second temperature of the fixed part; and a processor communicatively connected to the first temperature sensor and the second temperature sensor, wherein the processor is programmed to determine a relative displacement of the platform relative to the fixed part based upon the first temperature and the second temperature.

In another embodiment, the disclosure includes a method for determining the position of a MEMS actuator in a camera system, the method comprising receiving a first temperature measurement from a first temperature sensor disposed on a movable platform of the MEMS actuator; receiving a second temperature measurement from a second temperature sensor disposed on a fixed part of the MEMS actuator; calculating a temperature difference between the first temperature measurement and the second temperature measurement; determining a displacement of the movable platform relative to the fixed part based on the calculated temperature difference; and adjusting the focus of the camera system based on the determined displacement. These and other features will be more clearly understood from the following detailed description taken in conjunction with the accompanying drawings and claims.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

In the description and claims, terms such as "vertical," "horizontal," "upper," "lower," and similar directional or orientational language are used to describe the invention as depicted in the accompanying figures. These terms are intended for illustrative purposes to facilitate understanding of the invention's structure and operation relative to the figures and are not intended to limit the scope of the invention to specific orientations unless explicitly stated otherwise.

In the field of micro-electromechanical systems (MEMS), actuators are widely used for various applications, including autofocus mechanisms in camera systems. A common challenge in these systems is the accurate determination of the position of the actuator, which is important for ensuring precise control and functionality. Traditional methods for position sensing in MEMS actuators often rely on capacitive feedback or piezoelectric materials integrated into the system. However, these methods can introduce additional complexity, cost, and potential reliability issues due to the need for extra components and intricate integration processes.

Solutions that have been previously developed have attempted to address the position sensing challenge through various means. For instance, some systems utilize capacitive sensors to detect changes in capacitance as the actuator moves, providing an indirect measure of position. While effective to some extent, these systems can suffer from limitations such as sensitivity to environmental conditions, including temperature and humidity, which can affect the accuracy and reliability of the position measurements. Additionally, the integration of capacitive sensors can complicate the design and manufacturing process, leading to increased production costs and potential yield issues.

The present disclosure provides an innovative approach to position sensing in MEMS actuators by leveraging the thermal properties of the system. This method introduces a technique for determining the position of a MEMS actuator by measuring the temperature difference between the moving and fixed parts of the actuator. By incorporating temperature sensors on both the actuator's moving platform and the fixed part, this method enables the calculation of a temperature difference that correlates with the actuator's position. This approach not only simplifies the design by eliminating the need for additional capacitive or piezoelectric components but also enhances the reliability and accuracy of position measurements, as the method is less susceptible to environmental variations. The described technique offers a cost-effective and efficient solution for position sensing in MEMS actuators, particularly in applications such as autofocus camera systems, where precise control is important.

Figure 1:
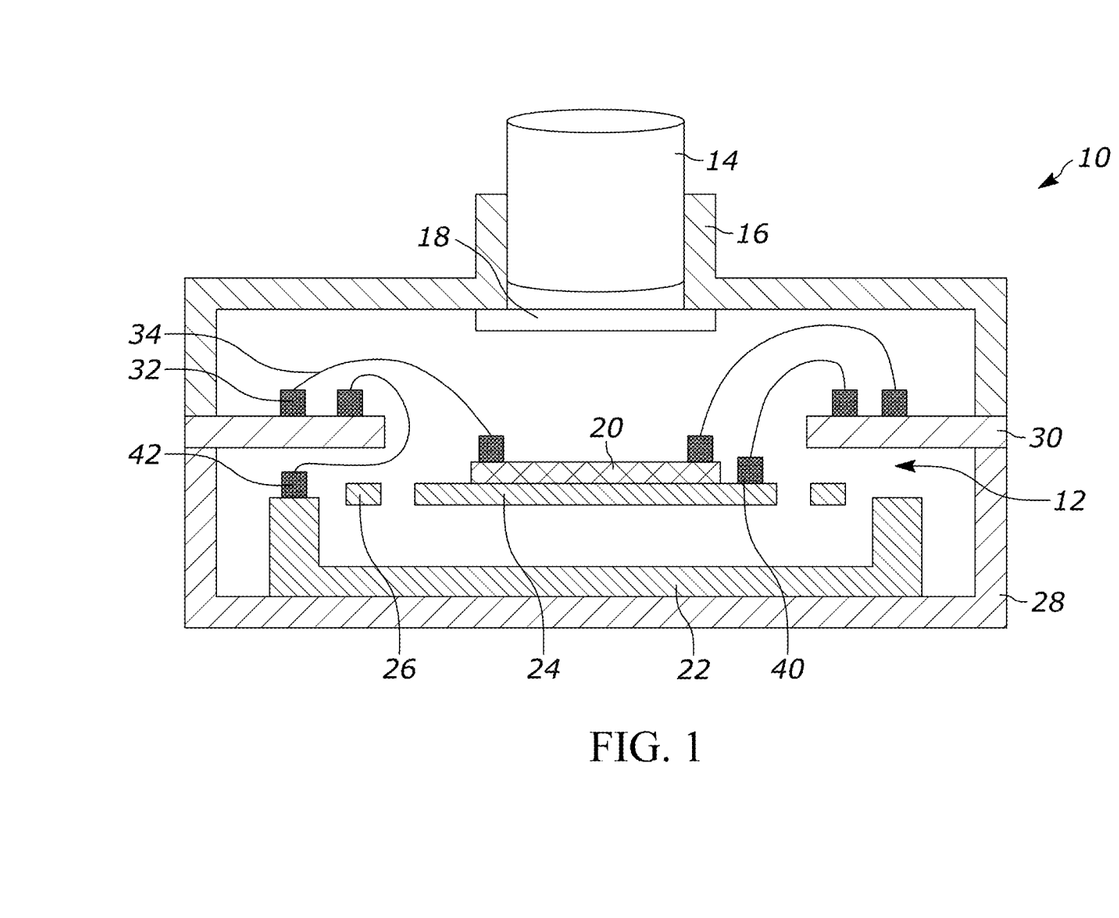
FIG. 1 illustrates a cross-sectional view of a camera system incorporating a MEMS device to achieve focus adjustments, according to an embodiment.

FIG. 1 illustrates a camera system 10 incorporating a MEMS actuator 12. The MEMS actuator 12 is configured to achieve precise focus adjustments due to its small size, low power consumption, and high precision. The camera system 10 with MEMS actuator 12 can be used in several different settings and applications, including smartphone cameras, automotive cameras (e.g., advanced driver-assistance systems (ADAS)), drones and aerial cameras, security and surveillance cameras, virtual reality devices, augmented reality devices, and others.

The camera system 10 includes a lens assembly 14, also referred to as a lens barrel. The camera system 10 also includes a lens holder 16 and an infrared (IR) filter 18. The lens holder 16 is a structural component that securely holds the lens assembly in place within the camera system 10. It ensures that the lenses are correctly aligned along the optical axis, which is important for maintaining focus and image clarity. It also is designed to withstand mechanical stresses and vibrations, especially in dynamic environments like automotive or drone applications. As such, it can be made of a durable material such as metal or high-strength plastic. The IR filter 18 is used to block infrared light from reaching image sensor 20. Infrared light, which is invisible to the human eye, can cause unwanted color shifts and reduce image quality if not filtered out. By blocking IR light, the IR filter 18 ensures that only visible light is captured, resulting in more accurate color reproduction and sharper images.

Figure 2:
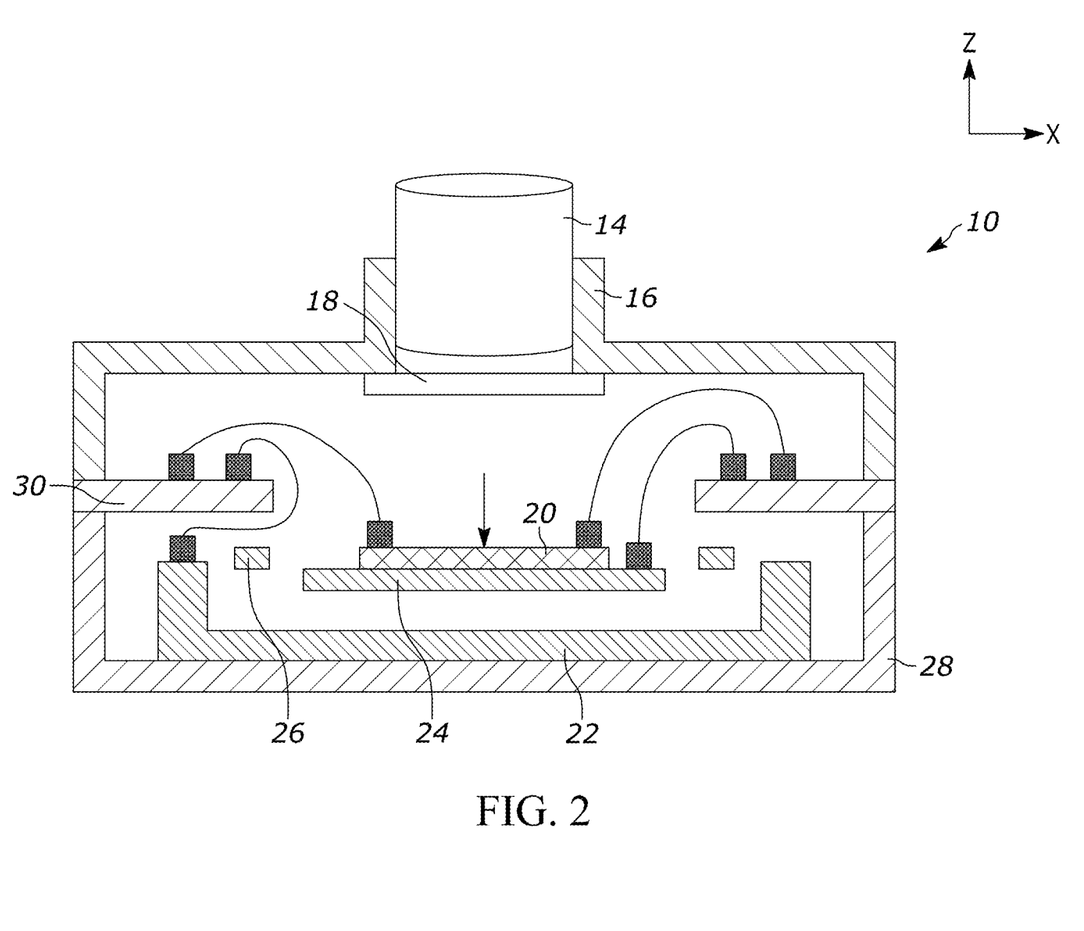
FIG. 2 illustrates a cross-sectional view of the camera system of FIG. 1 with a platform of the MEMS device being displaced in a vertical direction along an optical axis (z), according to an embodiment.

The MEMS actuator 12 includes a fixed part 22 and a platform 24. The platform 24 may be suspended via springs 26. The springs 26 are configured to support the suspended platform 24 while allowing for vertical displacement of the platform 24 relative to the fixed part 22. For example, FIG. 2 shows the platform 24 in a vertically depressed position relative to the fixed part 22. Said another way, the platform 24 can moved in the Z direction relative to the fixed part 22. As such, the platform 24 can be referred to as a vertically-moveable part or rotor, while the fixed part 22 can be referred to as a stator.

The image sensor 20 is attached to the platform 24 such that it moves vertically with the platform 24. The image sensor 20 can be attached to the platform 24 using die bond techniques via a glue or an adhesive, for example. In embodiments, the image sensor 20 is connected to the platform 24 via direct bonding to platform, or via bonding with an intermediate later (e.g., ceramic or metal substrate). In some designs, the adhesive is applied only to the edges of the sensor, leaving the central area free. This method can reduce stress on the sensor die and improve thermal dissipation by allowing airflow or additional cooling mechanisms. Whether a direct or indirect connection is provided between the image sensor 20 and the platform 24, it should be understood that such a connection forces the image sensor 20 to move in unison with the platform 24.

The MEMS actuator 12 with the image sensor 20 are housed within a package 28. The package 28 may be a compact, hermetically sealed package to protect the components from environmental factors such as dust, moisture, and temperature fluctuations. While the Figures illustrate the package 28 as directly including or integrated with the lens holder 16, it should be understood that these may be separate components. The package 28 may be constructed from materials like ceramic or metal, which provide robust protection and thermal stability. The package 28 can include a transparent window or lens (e.g., above IR filer 18) made from glass or a high-grade polymer to allow the image sensor to capture images without obstruction. In another embodiment, the package may incorporate a flexible polymer casing that allows for some degree of movement or expansion, accommodating the vertical displacement of the platform within the MEMS device. This flexible casing could be beneficial in applications where the device is subject to mechanical stress or vibration. Additionally, the package 28 can feature integrated heat dissipation elements, such as fins or a heat sink, to manage the thermal output from the processor and sensors, ensuring optimal performance and longevity of the device. The package 28 design can also vary in size and shape, depending on the specific application requirements.

In the illustrated embodiment, the package 28 is attached to an underside or back of a circuit board 30. This configuration is particularly advantageous for compact electronic devices where space is at a premium. By mounting the package on the underside of the circuit board, the overall height of the assembly can be minimized, allowing for a slimmer device profile. However, the present disclosure is not limited to such an embodiment. The attachment between the package 28 and the circuit board 30 can be achieved using soldering or adhesive techniques, ensuring a secure and stable connection. This method also facilitates efficient thermal management, as the circuit board 30 can act as a heat sink, dissipating heat generated by the MEMS actuator 12 and image sensor 20. The image sensor 20 is mounted on the upper side of the platform 24, directly above the MEMS actuator 12, and directly below the lens and lens holder 16. Moreover, the circuit board 30 illustrated here does not need to be the main PCB of the camera; it can be a PCB for processing and controlling other aspects.

The circuit board 30 can be different types of circuit boards, and can include one or more different components. For example, the circuit board may be a rigid printed circuit board (PCB), a flexible PCB, a high-density interconnect (HDI) PCB, a metal core PCB (MCPCB), or the like. Likewise, the image sensor 20 can be different types of image sensors, such as a charge-coupled device (CCD) sensor, a complementary metal-oxide-semiconductor (CMOS) sensor, a Time-of-Flight (ToF) sensor, an infrared (IR) sensor, or the like. Of course, depending on the type of image sensor utilized, other components shown herein can be modified or removed. For example, if the image sensor 20 is an infrared sensor, the IR filter can be removed.

In the illustrated embodiment, the image sensor 20 is connected to the circuit board 30 via circuit board pads 32 and wires 34. The circuit board pads 32 are conductive areas on the circuit board 30 designed to facilitate electrical connections. They serve as the interface points for connecting wires 34 from the image sensor 20 to the circuit board 30. The wires 34 can be bonded using wire bonding techniques. With the image sensor 20 connected to the top of the platform 24, the wires 34 accommodate for vertical movement of the image sensor 20 and platform 24. For example, the wires 34 may be arranged with slack or in a looped configuration to absorb the movement of the sensor 20. This design ensures that the wires 34 do not impede the sensor's motion and remain intact throughout the device's operation.

Figure 3:
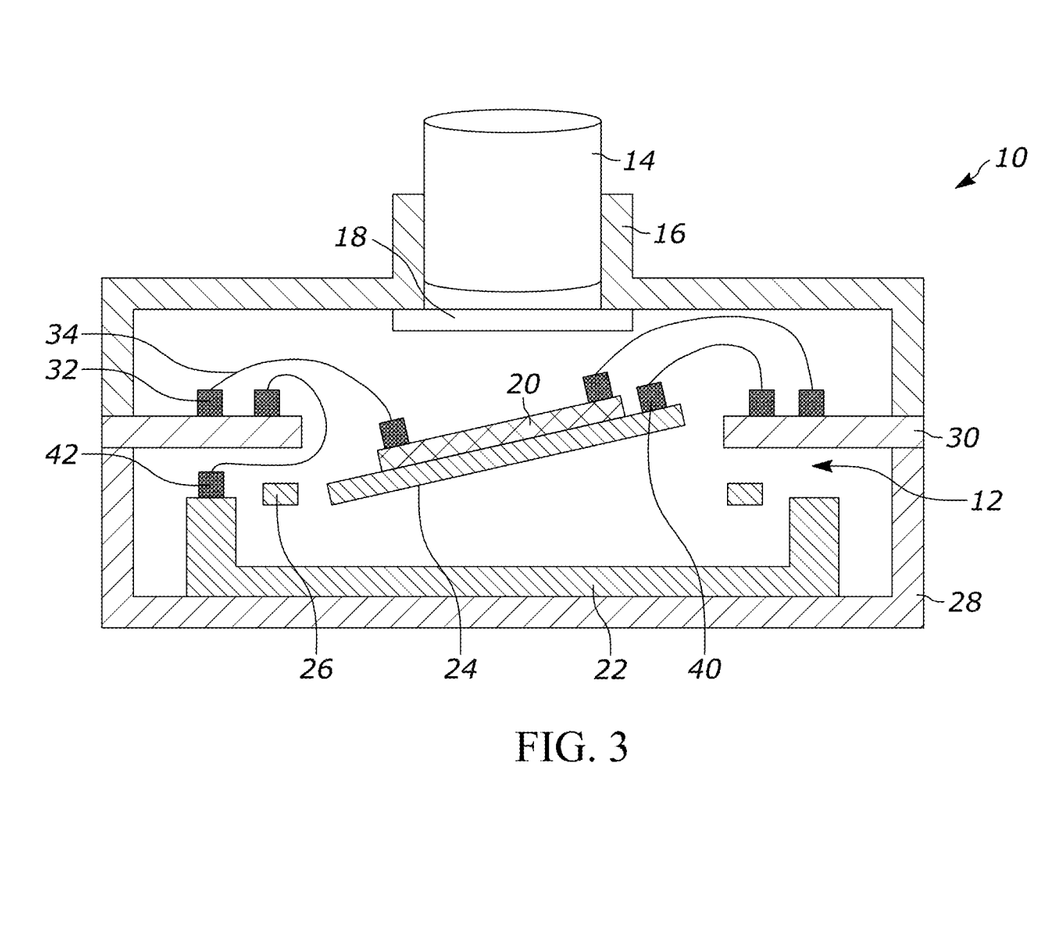
FIG. 3 illustrates a cross-sectional view of the camera system of FIG. 1 with the platform of the MEMS device in a tilt motion about one or both in-plane axes (x and/or y), according to an embodiment.

As indicated above, it has been observed that the temperature of the sensor varied almost directly with its position, due to changes in thermal resistance as the rotor of the MEMS actuator moved into and out of the stator comb. This discovery highlighted a nearly linear relationship between the sensor's position and its temperature change. To leverage this phenomenon, temperature sensors, such as thermocouples or thermistors, are strategically attached to both the fixed part (stator) and the moving platform (rotor) of the actuator. For example, as shown in FIGS. 1-3, a first temperature sensor 40 and a second temperature sensor 42 are provided. The first temperature sensor is attached to the platform 24 or image sensor 20, or internal to the image sensor 20, and therefore is configured to sense the temperature of the platform 24 or image sensor 20. The second temperature sensor 42 is attached to the fixed part 22 so as to sense the temperature of the fixed part 22.

Each temperature sensor 40, 42 is connected to one or more processors. The processor(s) can be located on the circuit board 30 or another PCB in the camera. Therefore, as shown in FIGS. 1-3, each temperature sensor 40, 42 can be connected to the processor via circuit board pads and wires. The layout and configuration of these sensors 40, 42 and wires can vary depending on the design of the camera system 10. Additionally, the PCB or processors disclosed herein need not be within the camera or package 28, but can be connected to an external camera module (not shown).

The processor(s) on the circuit board 30 may include a microcontroller, a digital signal processor (DSP), or the like. The disclosed system is not limited to a particular type of processor. Instead, generally, the system may be said to include a "controller" that executes code and memory hardware (shared, dedicated, or group) that stores code executed by the processor hardware. The code is configured to provide the features of the controller and systems described herein. In one example, the controller may include a processor, memory, and non-volatile storage. The processor may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory. The memory may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage may include one or more persistent data storage devices such as a hard drive, optical drive, tape drive, non-volatile solid-state device, or any other device capable of persistently storing information. The processor may be configured to read into memory and execute computer-executable instructions embodying one or more software programs residing in the non-volatile storage. Programs residing in the non-volatile storage may include or be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the programs may be configured, upon execution by the processor, to determine a temperature difference between (i) the platform 24 and/or image sensor 20 and (ii) the fixed part 22, and, in turn, determine an amount of displacement of the platform 24 and/or image sensor 20 based on the determined temperature difference.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, e.g., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

As mentioned above, the inventors have discovered that the temperature readings from the first sensor 40 varies almost in direct correlation with the vertical position of the sensor 20. This is due to the thermal resistance (° C./W) changes as the moving part (e.g., platform 20) of the actuator 12 moves into and out of the static part (e.g., fixed part 22) of the actuator 12. Heat (circa 0.5 W) is generated by sensor's processor and leads an increase in die temperature.

Figure 4:
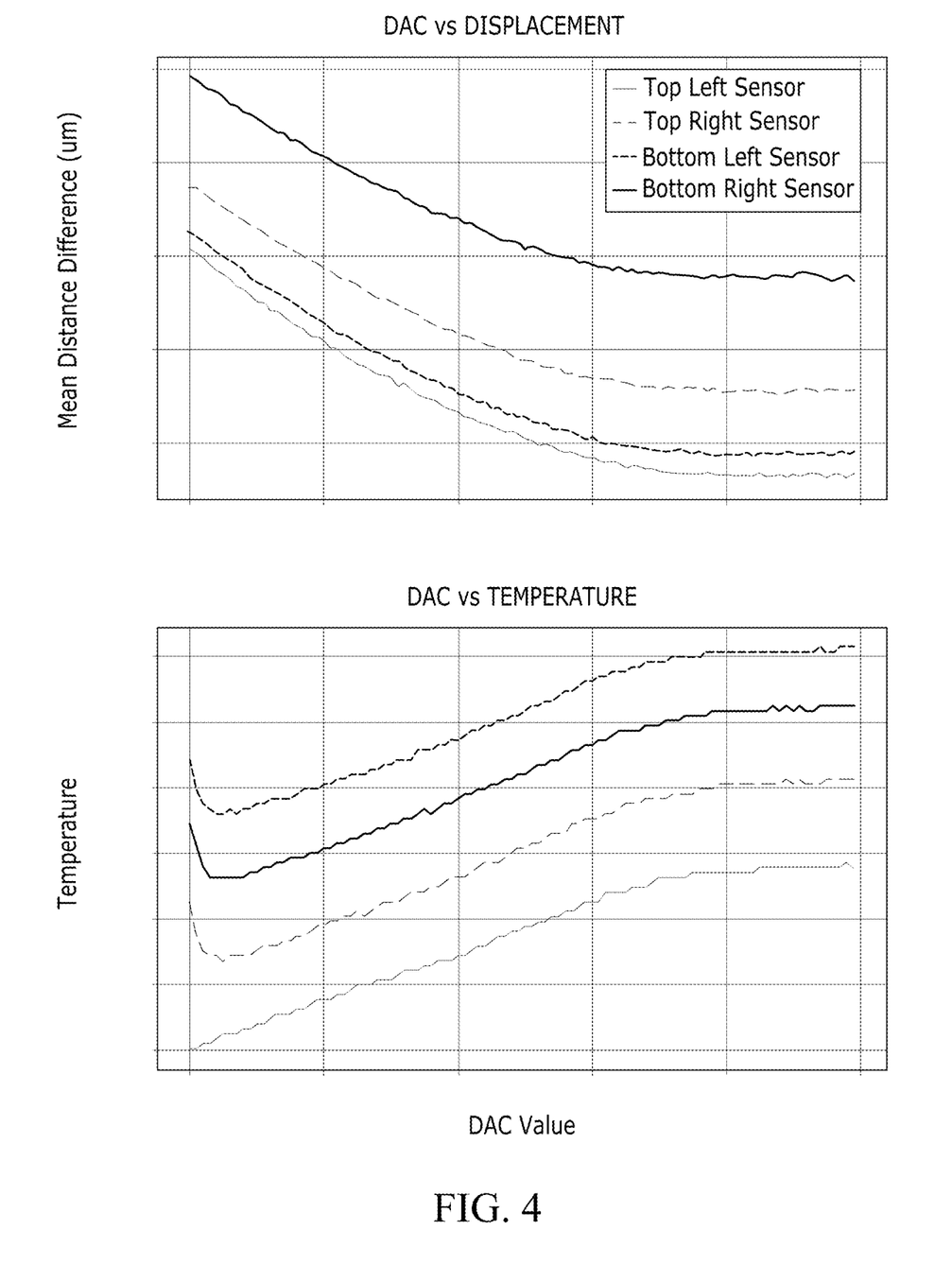
FIG. 4 illustrates a graph showing the relationship between DAC values and displacement and temperature for various sensor positions, according to an embodiment.
Figure 5:
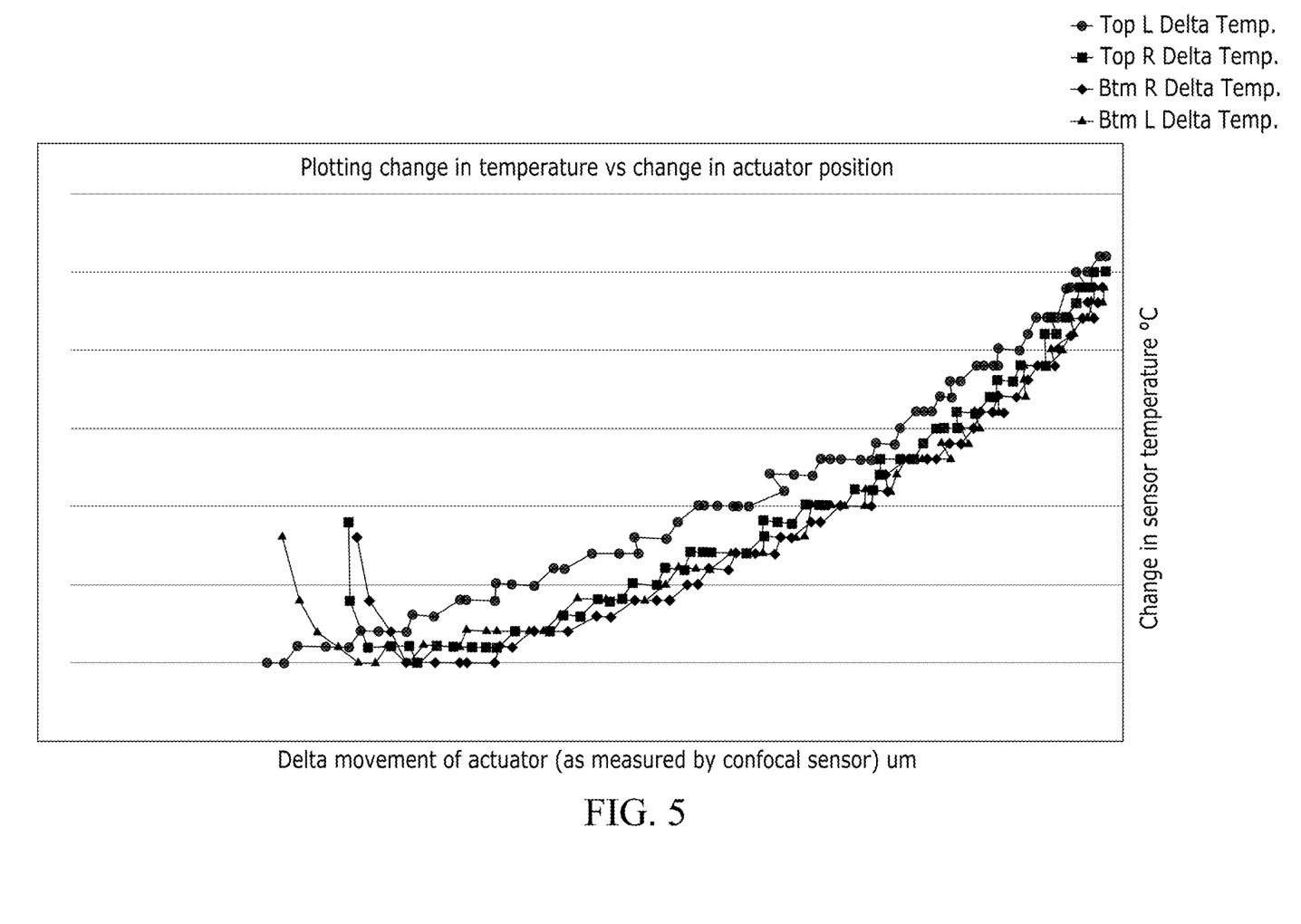
FIG. 5 is a graph illustrating the correlation between temperature change and actuator position displacement associated with the data shown in FIG. 4, according to an embodiment.
Figure 6:
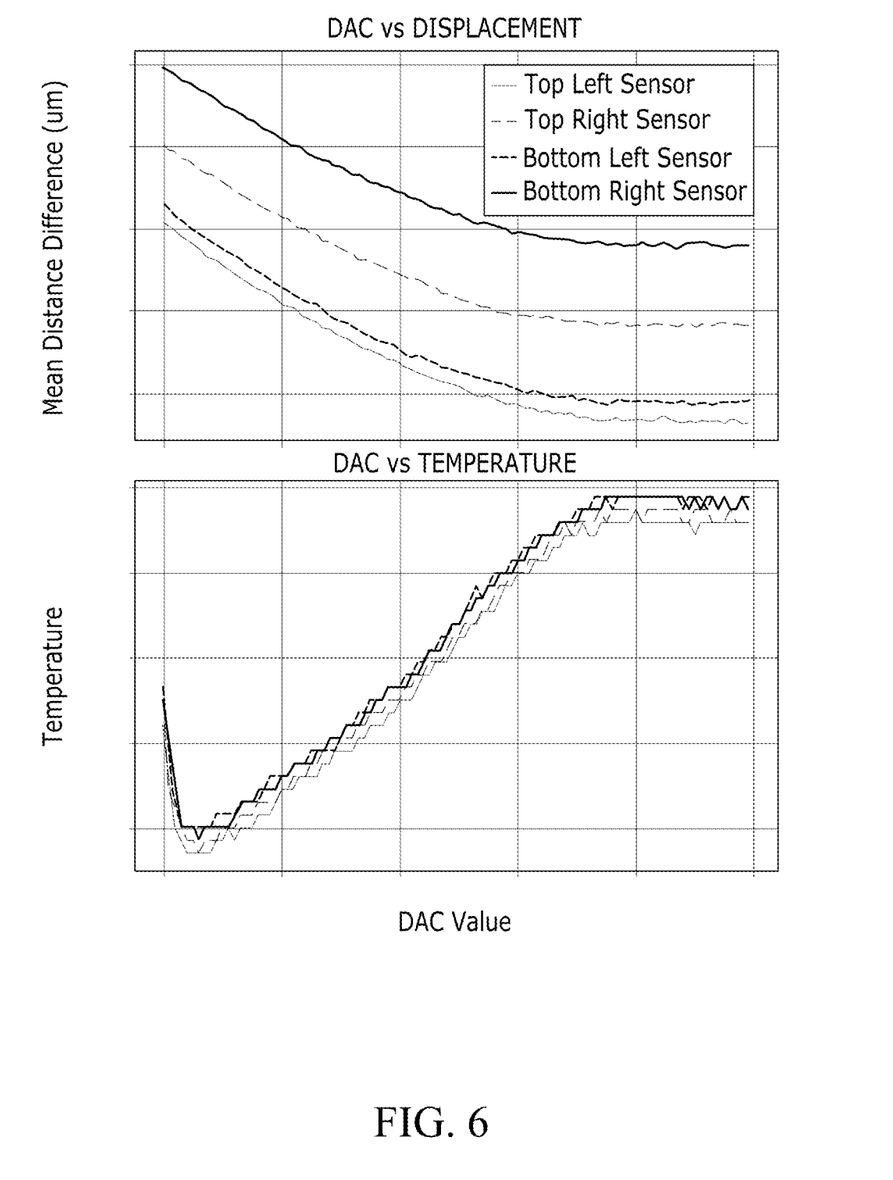
FIG. 6 illustrates a graph showing the relationship between DAC values and displacement and temperature for various sensor positions, according to another embodiment.
Figure 7:
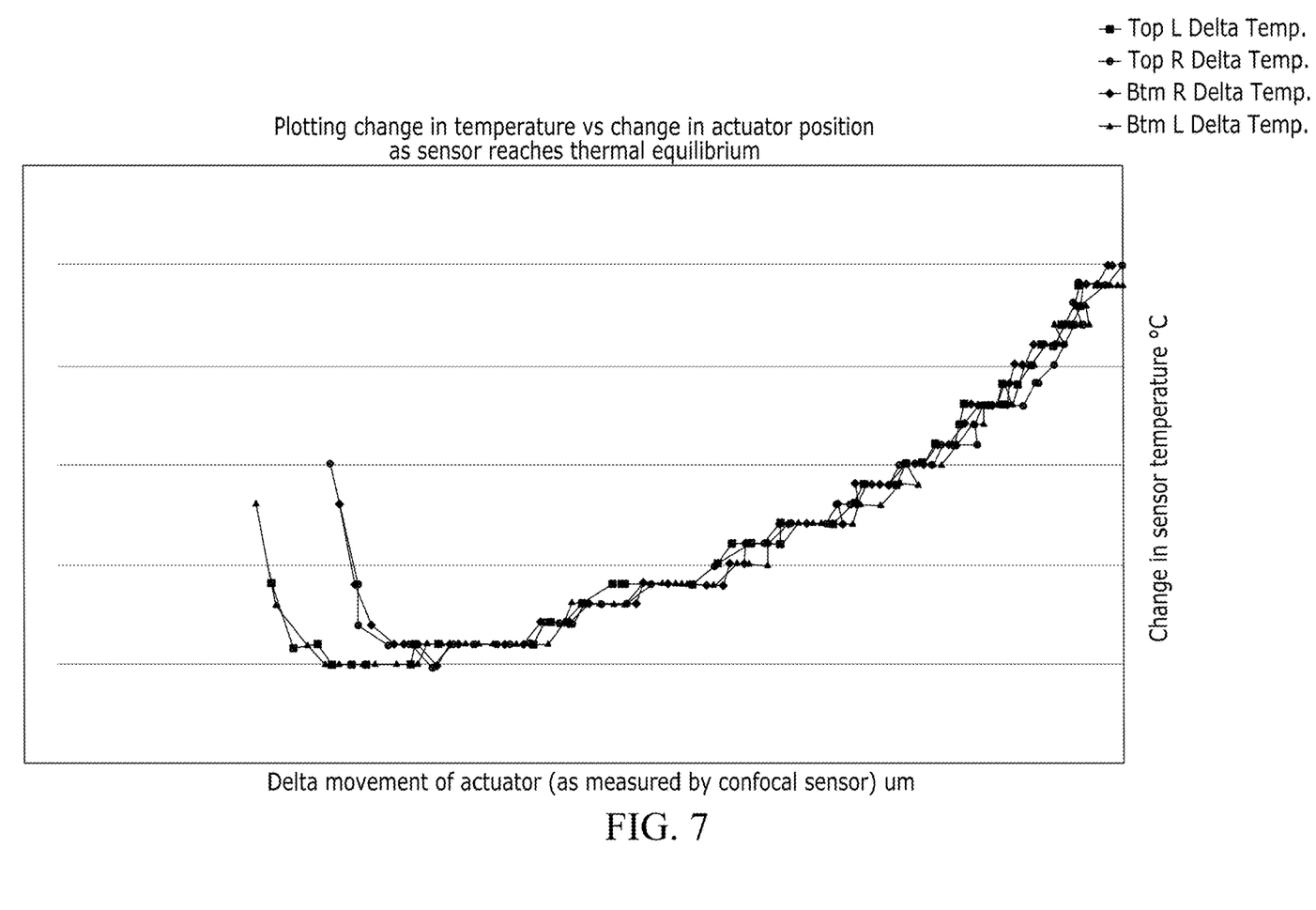
FIG. 7 is a graph illustrating the correlation between temperature change and actuator position displacement associated with the data shown in FIG. 6, according to an embodiment.

As an example, FIG. 4 illustrates two plots (initial real-time data) that show test comparisons. The first plot shows a digital-to-analog converter (DAC) value versus displacement. As shown, the DAC value decreases as the measured displacement increases. Here, the displacement as measured with a confocal sensor. The second plot shows the inverse: as the temperature of the temperature sensor 20 (or platform 24) heats up, the DAC value increases. Comparing the two plots, this shows that the change in temperature is an inverse of the displacement. FIG. 5 shows a plotted movement of the actuator (again as measured by the confocal sensor) relative to the temperature change. When the temperature change is plotted against the movement of the platform, there is almost a linear relationship between them. After some time (e.g., 10 minutes, 20 minutes, 30 minutes), thermal equilibrium is reached and the readings align. This is illustrated in FIGS. 6-7.

Given this discovered relationship, the system can be programmed to measure displacement as a function of temperature difference between the platform/sensor and the fixed part of the actuator. Determining the displacement of the actuator is important for various scenarios. For example, at the beginning of a power cycle the actuator can be commanded to move, and a determined change in the displacement can act as a check that the actuator indeed moved according to its instructions. In another example, if the system is used in a vehicle setting, when the vehicle is being started, rather than starting the camera and displaying the camera's view on the screen (which may be out of focus), verification can be made to assure the camera is indeed in focus before the consumer sees it unfocused.

Knowing the vertical displacement of the platform 24 of the camera system offers additional benefits. First, it can enable real-time autofocus adjustments, ensuring that the camera maintains optimal focus even as the subject or environmental conditions change. This can be particularly beneficial in dynamic settings, such as photography or drone imaging, where rapid focus shifts are necessary. Second, it allows for enhanced image stabilization by compensating for vibrations or movements, which may be crucial in applications like handheld devices or automotive cameras. Additionally, precise displacement data can improve depth sensing and 3D imaging capabilities, which are valuable in augmented reality (AR) and virtual reality (VR) applications. Furthermore, monitoring displacement can aid in predictive maintenance by detecting anomalies in actuator movement, potentially indicating wear or failure, thus allowing for timely interventions.

Also, determining the displacement in the fashions disclosed herein eliminates the need for other displacement sensors, thus saving money.

In embodiments, the first temperature sensor 40 includes multiple discrete temperature sensors strategically dispersed across various locations on the platform 24 or the image sensor 20. This is shown in the plots of FIGS. 4-7. These sensors 40 are positioned to capture temperature variations at different points, providing a comprehensive thermal profile of the platform or image sensor. The individual temperature readings from each sensor can be transmitted to the processor on the circuit board 30, which is programmed to compute an average temperature value. This averaged temperature reading is then used to determine the relative vertical displacement of the platform with respect to the fixed part. The distribution of sensors can be optimized based on the specific thermal characteristics and expected temperature gradients of the platform or image sensor, ensuring accurate and reliable displacement measurements. This configuration allows for enhanced precision in detecting positional changes, as the setup accounts for localized temperature fluctuations that might otherwise skew the displacement calculation if only a single sensor were used. Additionally, the use of multiple sensors can help mitigate the effects of transient thermal disturbances, providing a more stable and consistent measurement over time.

Similarly, the second temperature sensor 42 can include multiple discrete temperature sensors strategically dispersed across various locations on the fixed part 22.

Figure 8:
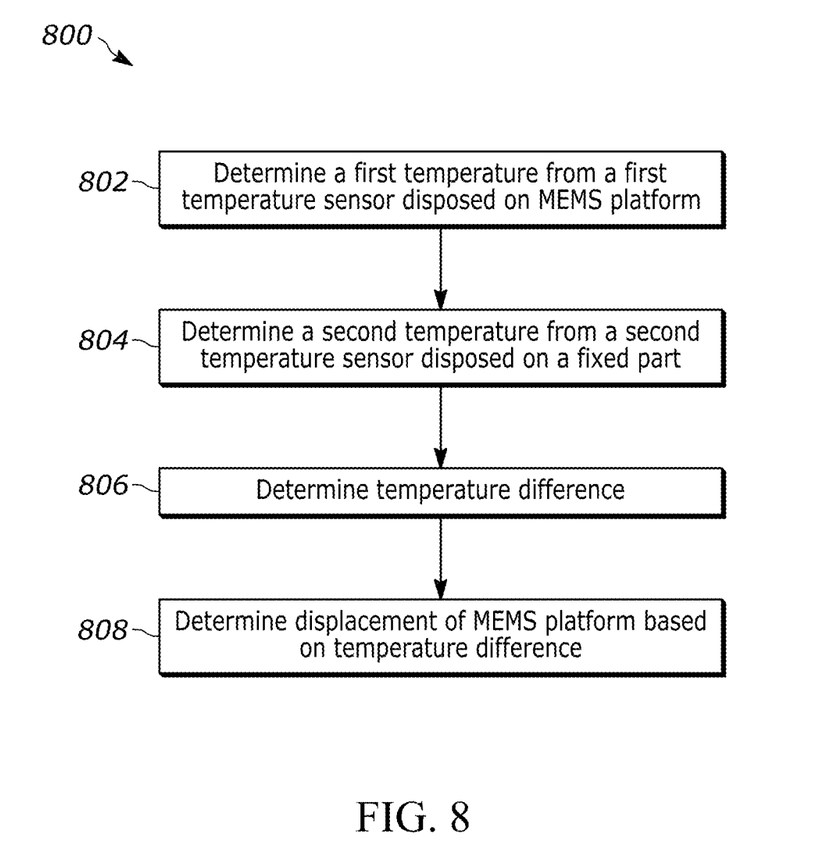
FIG. 8 illustrates a flow chart diagram of a method for determining MEMS platform displacement using temperature differences, according to an embodiment.

FIG. 8 illustrates a method 800 of determining a displacement of a MEMS platform, according to an embodiment. This method may be implemented by one or more of the processors described herein. At 802, the processor receives (or determines) a first temperature from a first temperature sensor, wherein the first temperature sensor is disposed on the MEMS platform of a MEMS actuator (or an image sensor bonded to the MEMS platform). At 804, the processor receives (or determines) a second temperature from a second temperature sensor, wherein the second temperature sensor is disposed on a fixed part of the MEMS actuator. At 806, the processor determines a temperature difference between the first temperature and the second temperature. At 808, the processor determines a displacement of the platform (or image sensor) relative to the fixed part of the MEMS actuator based on the temperature difference.

Once the displacement of the MEMS platform is determined, several commands or outputs can be issued to optimize the performance and functionality of the camera system. The system can automatically adjust the focus of the camera to ensure that the image remains sharp and clear, which is particularly useful in dynamic environments where the subject or camera position changes frequently. Additionally, commands can be issued to compensate for any detected vibrations or movements, enhancing image stabilization and reducing blurriness in captured images or videos. The displacement data can also be used to calibrate the system, ensuring that the MEMS actuator operates within its optimal range and maintains accurate positioning over time. If the displacement data indicates unusual movement patterns or deviations from expected behavior, the system can trigger alerts for maintenance or inspection, potentially preventing failures or malfunctions. Furthermore, based on the displacement, the system can optimize power usage by adjusting the actuator's activity, reducing energy consumption when full movement is not necessary. The displacement information can also enhance depth sensing capabilities, improving the accuracy of 3D imaging applications in AR or VR environments. Before displaying the camera's view, the system can verify that the camera is in focus, ensuring that users see a clear image immediately upon activation.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A micro-electromechanical system (MEMS) device comprising:
    a fixed part;
    a platform suspended above the fixed part, wherein the platform is configured to move relative to the fixed part;
    an image sensor disposed on the platform such that it moves with the platform;
    a first temperature sensor disposed on either the platform or the image sensor such that the first temperature sensor moves with the platform, wherein the first temperature sensor is configured to measure a first temperature of either the platform or the image sensor;
    a second temperature sensor disposed on the fixed part, wherein the second temperature sensor is configured to measure a second temperature of the fixed part; and
    a processor communicatively connected to the first temperature sensor and the second temperature sensor, wherein the processor is programmed to (i) determine a temperature difference between the first temperature and the second temperature, and (ii) determine a relative displacement of the platform relative to the fixed part based upon the temperature difference.

2. The MEMS device of claim 1, wherein the first temperature sensor is disposed directly on the platform.

3. The MEMS device of claim 1, wherein the first temperature sensor is disposed directly on or internal to the image sensor.

4. The MEMS device of claim 1, wherein the MEMS device is part of an electrostatic actuator with pistons and tubes.

5. The MEMS device of claim 1, wherein the first temperature sensor includes a plurality of discrete temperature sensors dispersed across various locations on the platform.

6. The MEMS device of claim 5, wherein the processor is programmed to determine the first temperature based on an average readings from the discrete temperature sensors.

7. The MEMS device of claim 1, wherein the platform is suspended via springs configured to allow for movement of the platform.

8. The MEMS device of claim 1, wherein the image sensor is disposed directly on the platform.

9. A micro-electromechanical system (MEMS) device comprising:
    a fixed part;
    a platform moveable relative to the fixed part;
    an image sensor disposed on the platform such that it moves with the platform relative to the fixed part;
    a first temperature sensor disposed on the platform such that the first temperature sensor moves with the platform relative to the fixed part, wherein the first temperature sensor is configured to measure a first temperature of the platform;
    a second temperature sensor disposed on the fixed part, wherein the second temperature sensor is configured to measure a second temperature of the fixed part; and
    a processor communicatively connected to the first temperature sensor and the second temperature sensor, wherein the processor is programmed to determine a relative displacement of the platform relative to the fixed part based upon the first temperature and the second temperature.

10. The MEMS device of claim 9, wherein the processor is programmed to (i) determine a temperature difference between the first temperature and the second temperature, and (ii) determine the relative displacement based on the temperature difference.

11. The MEMS device of claim 9, wherein the first temperature sensor is disposed directly on the platform.

12. The MEMS device of claim 9, wherein the first temperature sensor is disposed directly on the image sensor.

13. The MEMS device of claim 9, wherein the MEMS device is part of an electrostatic actuator with pistons and tubes.

14. The MEMS device of claim 9, wherein the first temperature sensor includes a plurality of discrete temperature sensors dispersed across various locations on the platform.

15. The MEMS device of claim 14, wherein the processor is programmed to determine the first temperature based on an average readings from the discrete temperature sensors.

16. A method for determining the position of a micro-electromechanical system (MEMS) actuator in a camera system, the method comprising:
    receiving a first temperature measurement from a first temperature sensor disposed on a movable platform of the MEMS actuator;
    receiving a second temperature measurement from a second temperature sensor disposed on a fixed part of the MEMS actuator;
    calculating a temperature difference between the first temperature measurement and the second temperature measurement;
    determining a displacement of the movable platform relative to the fixed part based on the calculated temperature difference; and adjusting the focus of the camera system based on the determined displacement.

17. The method of claim 16, wherein the first temperature sensor disposed directly on the movable platform.

18. The method of claim 16, wherein the first temperature sensor includes a plurality of discrete temperature sensors dispersed across various locations on the movable platform, wherein the first temperature measurement corresponds to an average of temperature measurements output by the plurality of discrete temperature sensors.

19. The method of claim 18, wherein the discrete temperature sensors are located at corners of the movable platform.

20. The method of claim 16, wherein the platform is suspended via springs configured to isolate vibrations and allow for movement of the platform.

\* \* \* \* \*